United States Patent Office 3,848,028
Patented Nov. 12, 1974

3,848,028
PERMANENTLY ANTISTATIC ACRYLONITRILE POLYMERS CONTAINING A MERCAPTO POLYETHER
Helmut Engelhard, Leverkusen, Gunter Blankenstein, Stommeln, and Ulrich Reinehr, Dormagen, Germany, assignors to Bayer Aktiengesellschaft, Leverkusen, Germany
No Drawing. Filed Aug. 8, 1973, Ser. No. 386,509
Claims priority, application Germany, Aug. 8, 1972, P 22 38 940.8
Int. Cl. C08f 29/56
U.S. Cl. 260—898  4 Claims

ABSTRACT OF THE DISCLOSURE

Permanently antistatic acrylonitrile polymers consisting of a mixture of polyacrylonitrile or an acrylonitrile copolymer containing at least 70% by weight of acrylonitrile and as an antistatic agent 0.5 to 15% by weight of a mercapto polyether.

---

This invention relates to antistatic acrylonitrile polymers consisting of mixtures of polyacrylonitrile or of acrylonitrile copolymers with modified polyethers. The invention also relates to shaped products which have permanent antistatic and hydrophilic properties such as films, fibres and yarns, which can be produced by casting or spinning these mixtures from solution.

It is already known that synthetic polymer fibres, for example of acrylonitrile polymers, have the undesirable property of becoming electrically charged, which restricts their technical usefulness. This troublesome electric charging occurs when the surface resistance of the fibres is more than $10^{12}$ Ohm.

Various measures have already been taken to try and overcome this disadvantage. Frequent attempts have been made to increase the electric conductivity of the fibres, or of textile products produced from them by treating the surfaces with antistatic preparations. However, it is often found that the antistatic effect obtained is not sufficiently permanent. Another method of producing an antistatic finish consists of applying aqueous solutions of suitable substances to fibres which are in the aquagel state. The difficulty in this method lies in observing the particular conditions required.

It is also known that polyacrylonitrile can be mixed with a second acrylonitrile copolymer which contains 30 to 80% by weight of a polyethylene oxide methacrylate and then to spin this mixture. However, the high proportion of polyethylene oxide required causes yellowing of the fibres on exposure to heat or light so that additional stabilizers are necessary to overcome these disadvantages.

It is an object of this invention to provide new permanently antistatic acrylonitrile polymers.

Further objects will be evident by the following description and the examples.

These objects are accomplished by acrylonitrile polymers consisting of mixtures of polyacrylonitrile or acrylonitrile copolymers containing at least 70% by weight of acrylonitrile and 0.5 to 15% by weight, based on the total mixture, of a mercapto polyether of the formula:

X—S—Y in which
X=the grouping

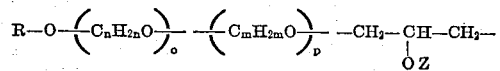

R=$C_{1-30}$ alkyl, cycloalkyl, $C_{3-30}$-alkenyl, aryl, polyaryl, alkaryl or aralkyl,
n=an integer of from 2 to 4,
m=an integer of from 2 to 4,
o=zero or an integer of from 1 to 40,
p=an integer of from 4 to 40,
Z=hydrogen or the grouping

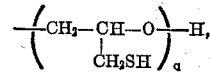

q=an integer of from 1 to 10, and
Y=hydrogen, an ionic valency of a monovalent to trivalent cation or X.

Mercaptopolyethers of the following formula, for example, are used:

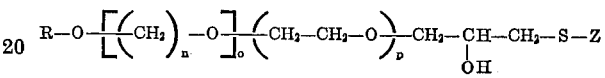

wherein

R represents a $C_{10}$-$C_{18}$ alkyl, cyclohexyl, phenyl, naphthyl, diphenyl, cresyl, $C_{2-9}$ alkylphenyl or benzyl,
p=an integer of from 6 to 18,
o=zero or an integer of from 1 to 20,
n=2 or 3, and
Z represents hydrogen or the grouping.

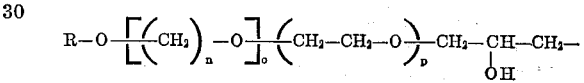

These acrylonitrile polymers can be used for producing permanently antistatic polyacrylonitrile fibres or fibres of copolymers of acrylonitrile with other copolymerisable compounds, which fibres do not have the disadvantages mentioned above. The invention therefore also relates to permanently antistatic shaped products such as fibres, yarns or foils containing 0.5 to 50% by weight of a mercaptopolyether as antistatic agent. Fibres or yarns can be produced by dissolving the two components in a suitable solvent to form a homogeneous mixture which contains 0.5 to 15% by weight of mercaptopolyether of the formula X—S—Y and then spinning the solution by known processes and stretching, washing and drying the yarns. The compounds which are added to the polymer solution in accordance with the invention can be obtained relatively cheaply in known manner by a single stage reaction.

Alcohols or phenols such as methanol, ethanol, aryl alcohol, stearyl alcohol, allyl alcohol, oleoly alcohol, cyclohexyl alcohol, phenol, naphthol, phenylphenol, cresol, nonylphenol, benzyl alcohol, or reaction products of phenol with styrene or p-methylstyrene are used as starting materials. Catalytic reaction of the OH groups in these compounds with ethylene oxide or propylene oxide either alone or as mixtures or in block are converted into compounds of the type

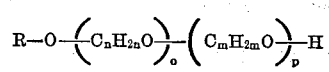

wherein R, n, m, o and p have the meanings already given.
Subsequent reaction of the resulting polyethers is carried out by methods which have already been described (see e.g. Houben-Weyl, Methoden der Organischen Chemie, volume 14/2, page 475 et seq.), i.e. the polyethers are reacted in the absence of solvent with an epihalohydrin, e.g. epichlorohydrin, at 50 to 180° C. in the presence of catalytic quantities of Lewis acids such as $SnCl_4$, $ZnCl_2$, $FeCl_3$, $SbCl_5$, $BF_3$, etc. to form products of the following constitution, which vary depending on the epihalohydrin used:

$$R-O-(-C_nH_{2n}O-)_o-(C_mH_{2m}O-)_p-CH_2-CH-CH_2-Hal$$
$$|$$
$$OH$$

or

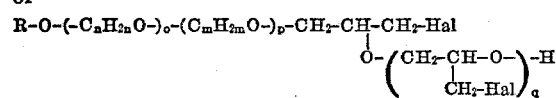

wherein

R, n, m, o, p and q have the meanings already given above and

Hal represents Cl, Br, I or F.

As already described in the literature (see Houben-Weyl, Methoden der Organischen Chemie, Volume 9, pages 7 et seq and 97 et seq), the polyethylene oxide halides are reacted again in the absence of solvent in a heterogeneous reaction at 30–120° C., e.g. with alkali metal bisulphides or alkali metal sulphides, to convert them into the desired compounds of the formula X—S—Y wherein X and Y have the meanings given above. The alkali metal halide formed in the reaction is removed from the melt by suction filtration or by taking up the reaction mixture in a suitable solvent in which the polyacrylonitrile or acrylonitrile copolymers are preferably also soluble. The free mercapto polyethylene oxides (i.e. in which Y=H) may be converted to the corresponding mercaptides with the aid of free bases such as ammonium hydroxides, alkali metal hydroxides or alkaline earth metal hydroxides if desired.

Apart from polyacrylonitrile, any acrylonitrile copolymers which contain at least 70% of acrylonitrile and up to 30% of one or more other copolymerisable compounds can be used for the purpose of the invention. The following are specific examples of suitable comonomers but the invention is not limited thereby:

Methacrylonitrile, chloroacrylonitrile, styrene, vinyl chlorides, vinyldidene chlorides, 1,3 - diacetoxy-2-methylenepropane, (meth)-acrylamide, N - monoalkyl-, N-dialkyl-(meth) - acrylamide, methacrylate, ethyl acrylate, butyl (meth)acrylate and higher alkyl (meth) acrylates, vinyl acetate, vinyl propionate or also acid additives, e.g. (meth) - allylsulphonate, styrene sulphonate, vinyl pyridine, alkylvinylpyridine, ω - dialkylaminoalkyl-(meth)acrylates, vinyl alkylethers, dialkylamino-alkyl-vinylethers, etc.

Another object of this invention is a process for producing permanently antistatic fibres and yards from polyacrylonitrile or an acrylonitrile copolymer containing at least 70% by weight of acrylonitrile, comprising spinning the solution of acrylonitrile polymers together with 0.5 to 15% by weight, based on the polymer mixture, of a mercapto polyether in a solvent for polyacrylonitrile. To prepare the solutions of mixtures of polyacrylonitrile or acrylonitrile copolymers with the compounds according to the invention, any solvents which will dissolve polyacrylonitrile and in which the mixtures are in a sufficiently homogeneous state to allow trouble free spinning may be used, e.g. dimethyl formamide, dimethyl acetamide, N-methylpyrrolidone, dimethyl sulphoxide or ethylene glycol carbonate.

The fibres produced according to the invention are not subject to yellowing even on prolonged exposure to light or heat and they have electric surface resistances of between $10^{10}$ and $10^{11}$ Ohm (23° C., 50% relative humidity) even when they contain only small quantities of the additives. The synthetic fibres are thus prevented from becoming highly charged electrically, in particular to above 2500 v. Even at low atmospheric humidities (20° C. 20% relative humidity) such as may occur in centrally heated rooms, the resistance remains far below the critical value of $10^{12}$ Ohm. Garments manufactured from the fibres, such as suits, coats, waistcoats or jackets, show hardly any signs of electrostatic charging and the usual troubles caused by electrostatic charging such as the garments sticking to the clothes hangers, soiling due to the attraction of dust and crackling or the like due to discharges or electric shocks are not observed. The fibres according to the invention can be dyed with the usual dyes for acrylic fibres without suffering any loss of their excellent antielectrostatic character and also in other respects they have all the functional properties of normal acrylic fibres.

The resistance of the fibres according to the invention given in the examples was determined by means of a commercial high resistance Ohmeter between the plates of two electrodes at a distance of 1 cm. apart and at a measuring voltage of 100 v. in accordance with the proposed standard procedure of DIN 54345. Before each determination, the fibre material was first conditioned to a normal atmosphere of 50% relative humidity at 23° C. for 72 hours.

The following examples are to further illustrate the invention without limiting it.

Example 1

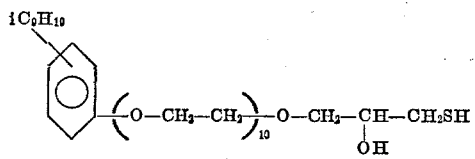

7 Parts by weight of boron trifluoride acetate were added to 660 parts by weight of an ethoxylated i-nonyl phenol (10 moles ethylene oxide per mole phenol) (OH%=2.5) under nitrogen, 93 parts by weight of epichlorohydrin were added dropwise at 120° C. with stirring and the reaction mixture was then stirred at this temperature for 2 hours. Small quantities of volatile constituents were then removed by evaporation under vacuum (12 mm.). A pale yellow, viscous oil remained behind.

Calculated: Cl, 4.75. Found: Cl, 4.70.

Solid commercial sodium bisulphide monohydrate was slowly added to 150 parts by weight of this adduct under an atmosphere of nitrogen at about 80 to 90° C. with stirring. The reaction mixture first turned green and then yellow. Stirring was continued for several hours, the water present was then evaporated off under vacuum and the sodium chloride formed was removed by suction filtration through a heated filter. A thick, yellow oil was obtained.

Calculated: S, 4.25. Found: S, 3.60. Calculated: Cl, 0. Found: Cl, 0.15.

A mixture of 90% by weight of an acrylonitrile copolymer (K-value: 83) and 10% by weight of the polyethylene oxide described above was dissolved in dimethylformamide and spun to give fibres by dry spinning. The surface resistance of the fibres, determined at 23° C. and 50% relative humidity, was at first $6 \times 10^{10}$ Ohm and after 8 washings it rose only to $9 \times 10^{10}$ Ohm.

Example 2

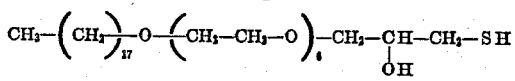

6 Parts by weight of boron trifluoride acetate were added to 270 parts by weight of an ethoxylated stearyl alcohol (6 moles of ethylene oxide per mole of alcohol) under an atmosphere of nitrogen, and the mixture was then reacted with 47 parts by weight of epichlorohydrin at 140 to 150° C. added dropwise with stirring. Stirring was then continued for 2 hours at the same temperature and the volatile constituents (4 parts by weight) were then removed at 12 mm. In the second stage of the reaction, the whole quantity of addition compound was reacted with 50 parts by weight of sodium bisulphide monohydrate for 3 hours at about 90° C. and the reaction product was then worked up as already described above. It consisted of a yellow, waxy mass.

Calculated: S, 5%. Found: S, 4.3%; Cl, 0.13%.

10% by weight of this compound were mixed with 90% by weight of the polyacrylonitrile in dimethylformamide and fibres were produced by dry spinning. The fibres had a titre of 2.3 dtex. and an elongation of 12%.

The antistatic properties, measured in terms of the surface resistance (23° C., 50% relative humidity) was found to be as follows: $5 \cdot 10^9$ Ohm on the freshly spun fibre; $2 \cdot 10^{10}$ Ohm after 10 washings with a commercial alkaline detergent.

Example 3

An ethoxylated stearyl alcohol (15 moles ethylene oxide per mole alcohol) was reacted with epichlorohydrin and then with sodium bisulphite monohydrate in a manner analogous to Example 2.

Fibres containing 10% by weight of the compound were obtained by dry spinning. They had a titre of 3.3 dtex., a section of 60 mm. and a glossy colour. Their antistatic properties were found to be as follows:

$3 \cdot 10^8$ Ohm on the fresh fibre;
$4 \cdot 10^{10}$ Ohm after 10 washings.

Examples 4 and 5

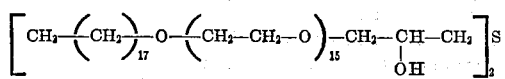

740 Parts by weight of an addition product synthesised as described in Example 2 from an ethoxylated stearyl alcohol (15 moles ethylene oxide) and epichlorohydrin were heated to 60° C. and reacted with 90 parts by weight of sodium sulphide nonahydrate for 3 to 4 hours under an atmosphere of nitrogen and with stirring. 53 Parts by weight of water were then removed under vacuum at 60 to 70° C. and sodium chloride was removed by suction filtration through a heated suction filter.

A yellowish product which was waxy when cold, readily soluble in dimethylformamide and compatible with polyacrylonitrile when mixed with it was obtained.

Calculated: S, 1.63. Found: S, 1.60.

This polyethylene oxide was used to prepare mixtures of 10% by weight and 5% by weight, respectively and 90% by weight and 95% by weight, respectively of acrylonitrile copolymer in dimethylformamide, and these mixtures were spun dried to produce fibres A and B.

|   | Titre, dtex. | Elongation, percent | Antistatic property (surface resistance) | |
|---|---|---|---|---|
|   |   |   | Fresh fibres | After 10 washings |
| A | 2.8 | 14 | $8 \cdot 10^9 \Omega$ | $1 \cdot 10^{10} \Omega$ |
| B | 2.9 | 13 | $2 \cdot 10^{10} \Omega$ | $3 \cdot 10^{10} \Omega$ |

Both fibres were then dyed in the usual manner with a dye conventionally used for acrylic fibres (Astrazon Red GTL, C.I. Basic Red, 18, 1105) and washed several times in alkaline washing water. The antielectrostatic effect was found to be unchanged.

A: $2 \cdot 10^{10} \Omega$
B: $3 \cdot 10^{10} \Omega$

Example 6

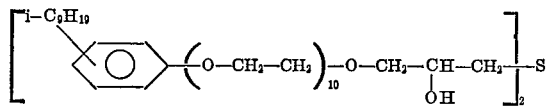

This ethoxylated disulphide was prepared in analogous manner from the epichlorohydric adduct and sodium sulphide nonahydrate without solvent at 60° C. The product was a thick yellow oil.

Calculated: S, 2.2. Found: S, 2.0.

Here again, fibres (C and D) obtained by spinning mixtures of the polyacrylonitrile which contained 5% by weight and 10% by weight, respectively of the compounds according to the invention were found to have very good antielectrostatic properties.

Surface resistance (50% relative humidity).

| Fresh fibres | After 10 washings |
|---|---|
| C: $3 \cdot 10^{10} \Omega$ | $5 \cdot 10^{10} \Omega$ |
| D: $8 \cdot 10^9 \Omega$ | $10^{10} \Omega$ |

Example 7

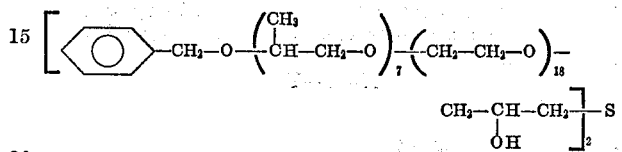

0.5 Parts by weight of sodium were added to 108 parts by weight of benzyl alcohol and when alkoxide formation was completed propylene oxide was added dropwise at 100 to 120° C. with stirring until the weight increase was 420 parts, and ethylene oxide then continued to be passed through until another weight increase of 800 parts by weight was obtained. The subsequent reactions with epichlorohydrin and sodium sulphide nonahydrate were carried out in the same way as described above.

Calculated: S, 1.15. Found: S, 0.90.

Fibres produced from a dimethylformamide mixture of 7.5% by weight of this adduct and 92.5% by weight of an acrylonitrile copolymer were found to have a reduced surface resistance.

Fresh fibres: $3 \cdot 10^{10} \Omega$
After 10 washings: $5 \cdot 10^{10} \Omega$

Example 8

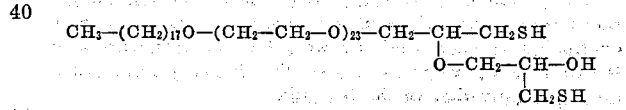

20 Parts by weight of boron trifluoride acetate were added to 1290 parts by weight of an ethoxylated stearyl alcohol (23 moles of ethylene oxide per mole of stearyl alcohol) in the course of 30 minutes at 100° C. under an atmosphere of nitrogen, and 185 parts by weight of epichlorohydrin were then added dropwise at the same temperature in the course of 2 to 3 hours. Stirring was then continued for one hour and small quantities of volatile constituents were evaporated off under vacuum.

Calculated: Cl, 4.8. Found: Cl, 5.0.

The reaction product, heated to 70° C., was then reacted in portions with 180 parts by weight of sodium bisulphide monohydrate in the course of 4 to 5 hours. The reaction was left to continue for 3 hours at this temperature and the water was then removed by evacuation and the reaction mixture was suction filtered as described above.

Calculated: S, 4.36. Found: S, 4.0; Cl, 0.15.

A mixture of 95% by weight of polyacrylonitrile and 5% by weight of this mercapto polyether could be dry spun from dimethylformamide to produce fibres which had good and permanent antistatic properties.

Surface resistance (fresh fibres): $4 \cdot 10^{10} \Omega$
After 10 washings: $6 \cdot 10^{10} \Omega$

Comparison test: (thermostability)

Mixtures of 95% by weight of polyacrylonitrile and 5% by weight of the following polyethers were used to prepare 25% solutions in dimethylformamide which were then tempered for 20 hours at 100° C. and their colour was then compared.

| Polyether | Colour |
|---|---|
| $CH_3-(CH_2)_{17}-O-(CH_2-CH_2-O)_r-H$ | Yellow. |
| $CH_3-(CH_2)_{17}-O-(CH_2-CH_2-O)_r-CH_2-CH(OH)-CH_2SH$ | Light. |
| $[CH_3-(CH_2)_{17}-O-(CH_2-CH_2-O)_r-CH_2-CH(OH)-CH_2]_2S$ | Do. |

What we claim is:

1. A permanently antistatic acrylonitrile polymer consisting of a mixture of polyacrylonitrile or an acrylonitrile copolymer containing at least 70% by weight of acrylonitrile and as an antistatic agent, 0.5 to 15% by weight, based on the total mixture, of a mercapto polyether of the formula $$X-S-Y$$

in which

X represents the group $$R-O-\left(C_nH_{2n}O\right)_o-\left(C_mH_{2m}-O\right)_p-CH_2-CH(OZ)-CH_2-$$

R represents a member selected from the group consisting of $C_{1-30}$-alkyl, cycloalkyl, $C_{3-30}$-alkenyl, aryl, polyaryl, alkaryl or aralkyl,
n represents an integer of from 2 to 4,
m represents an integer of from 2 to 4,
o represents O or is an integer of from 1 to 40,
p represents an integer of from 4 to 40,
Z represents hydrogen or $$-\left(CH_2-CH(CH_2SH)-O-\right)_q H$$

wherein
q represents an integer of from 1 to 10 and
Y represents hydrogen, the group X or an ionic valency of a monovalent to trivalent cation.

2. A permanently antistatic shaped product comprising a mixture of polyacrylonitrile or an acrylonitrile copolymer containing at elast 70% by weight of acrylonitrile with 0.5 to 15% by weight, based on the shaped product, of a mercapto polyether of the formula $$X-S-Y$$

in which

X represents the group $$R-O-\left(C_nH_{2n}O\right)_o-\left(C_mH_{2m}-O\right)_p-CH_2-CH(OZ)-CH_2-$$

R represents a member selected from the group consisting of $C_{1-30}$-alkyl, cycloalkyl, $C_{3-30}$-alkenyl, aryl, polyaryl, alkaryl or aralkyl,
n represents an integer of from 2 to 4,
m represents an integer of from 2 to 4,
o represents O or is an integer of from 1 to 40,
p represents an integer of from 4 to 40,
Z represents hydrogen or $$-\left(CH_2-CH(CH_2SH)-O-\right)_q H$$

wherein
q represents an integer of from 1 to 10 and
Y represents hydrogen, the group X or an ionic valency of a monovalent to trivalent cation.

3. A permanently antistatic fibre and thread comprising a mixture of polyacrylonitrile or an acrylonitrile copolymer containing at elast 70% by weight of acrylonitrile with 0.5 to 15% by weight, based on the shaped product, of a mercaptopolyether of the formula $$X-S-Y$$

in which

X represents the group $$R-O-\left(C_nH_{2n}O\right)_o-\left(C_mH_{2m}-O\right)_p-CH_2-CH(OZ)-CH_2-$$

R represents a member selected from the group consisting of $C_{1-30}$-alkyl, cycloalkyl, $C_{3-30}$-alkenyl, aryl, polyaryl, alkaryl or aralkyl,
n represents an integer of from 2 to 4,
m represents an integer of from 2 to 4,
o represents O or is an integer of from 1 to 40,
p represents an integer of from 4 to 40,
Z represents hydrogen or $$-\left(CH_2-CH(CH_2SH)-O-\right)_q H$$

wherein
q represents an integer of from 1 to 10 and
Y represents hydrogen, the group X or an ionic valency of a monovalent to trivalent cation.

4. A process for producing permanently antistatic fibres and threads from polyacrylonitrile or an acrylonitrile copolymer containing at least 70% by weight of acrylonitrile, comprising spinning a solution of said acrylonitrile polymer or copolymer said solution comprising from 0.5 to 15% by weight, based on the polymer mixture, of a mercaptopolyether of the formula of claim 1 in a polyacrylonitrile solvent.

References Cited

UNITED STATES PATENTS 3,163,620   12/1964   Von Branchel et al. __ 260—30.8
2,393,863   1/1946   Myers _____ 106—13

MURRAY TILLMAN, Primary Examiner

C. J. SECCURO, Assistant Examiner

U.S. Cl. X.R.

260—DIG 17, DIG 19